United States Patent [19]
Beutler et al.

[11] Patent Number: 6,139,364
[45] Date of Patent: *Oct. 31, 2000

[54] APPARATUS FOR COUPLING RF SIGNALS

[75] Inventors: Scott David Beutler, Barrington; Michael Steven Cruz, Buffalo Grove; Frank Robert Skutta, Palatine, all of Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/525,257

[22] Filed: Sep. 8, 1995

[51] Int. Cl.⁷ ................................................. H01R 13/648
[52] U.S. Cl. ............................................................ 439/607
[58] Field of Search ................................... 439/607, 493, 439/497, 579, 108, 581, 610

[56] References Cited

U.S. PATENT DOCUMENTS

| | | | |
|---|---|---|---|
| 3,513,433 | 5/1970 | Carroll | 439/579 |
| 3,643,208 | 2/1972 | Massa, Jr. | 439/610 |
| 3,651,432 | 3/1972 | Henschen et al. . | |
| 3,871,728 | 3/1975 | Goodman | 439/607 |
| 4,105,959 | 8/1978 | Stachejko . | |
| 4,157,612 | 6/1979 | Rainal . | |
| 4,220,955 | 9/1980 | Frye . | |
| 4,386,819 | 6/1983 | Asick et al. . | |
| 4,457,576 | 7/1984 | Cosmos et al. . | |
| 4,498,715 | 2/1985 | Peppler . | |
| 4,624,515 | 11/1986 | Brush, Jr. et al. | 439/608 |
| 4,762,500 | 8/1988 | Dola et al. . | |
| 4,897,046 | 1/1990 | Tengler et al. | 439/579 |
| 4,911,643 | 3/1990 | Perry et al. . | |
| 5,055,069 | 10/1991 | Townsend et al. . | |
| 5,073,130 | 12/1991 | Nakamura | 439/607 |
| 5,161,999 | 11/1992 | Broschard, III et al. . | |
| 5,195,899 | 3/1993 | Yatsu et al. . | |
| 5,232,377 | 8/1993 | Leibfried, Jr. . | |
| 5,292,256 | 3/1994 | Brunker et al. . | |
| 5,295,867 | 3/1994 | Bethurum | 439/108 |
| 5,454,734 | 10/1995 | Eggert et al. | 438/581 |

FOREIGN PATENT DOCUMENTS

| | | |
|---|---|---|
| 617487A1 | 9/1994 | European Pat. Off. . |
| 1450257 | 9/1976 | United Kingdom . |
| 1280794 | 7/1979 | United Kingdom . |
| 2276989 | 10/1994 | United Kingdom . |
| 95/13663 | 5/1995 | WIPO . |

*Primary Examiner*—Neil Abrams
*Attorney, Agent, or Firm*—John J. King; Daniel Collopy

[57] ABSTRACT

A unique apparatus for coupling radio frequency (RF) signals from a wireless communication device (200) to an external device by way of an I/O port (116). In particular, a connector having three adjacent contact elements (238) couples signals to an external device wherein the first and third contact elements (239, 241) are electrically coupled to a ground plane (302) and wherein the second or middle contact element (240) is electrically coupled to a conductive RF signal path (344). The ground plane and the conductive path (334) are preferably on a printed circuit (pc) board which is preferably a three layer board with the conductive path (334) located between two ground planes (302, 352). The connector is substantially covered with a shield (230) coupled by legs (248) to the ground plane (302) at apertures (332). A mating connector (400) also includes a shield (430) which is commonly grounded. The mating connector preferably includes an internally located coaxial connector (412) and cable (414) to minimize loss of RF communication signals. Components of the connectors (116, 400) are selectively grounded to eliminate RF interference and establish a reliable RF ground reference to a pc board (300) of the wireless communication device and the coaxial connector. The connectors also include latching members (405) and apertures (250) for firm coupling therebetween.

5 Claims, 6 Drawing Sheets

APPARATUS FOR COUPLING RF SIGNALS

FIELD OF THE INVENTION

The present invention is generally related to coupling devices, and more particularly to a method and apparatus for coupling signals in an electronic device.

BACKGROUND OF THE INVENTION

Wireless communication devices such as cellular radiotelephones transmit and receive radio frequency (RF) communication signals from a fixed base station associated with a communication system, such a cellular radiotelephone communication system, PCS network, paging network or other communication network. While conventional wireless communication devices transmit RF signals and receive RF signals by way of an integral antenna, it may be desirable to transmit the RF communications signals external to the device, such as to an external antenna, by way of a hardwired connection. For example, a cellular radiotelephone may be physically coupled to a charging cradle installed in a vehicle to provide coupling of RF signals to a separate high power transceiver and an external antenna.

Conventional wireless communication devices have incorporated an external input/output (I/O) port for transmitting RF communication signals to the charging cradle or other external device. When transmitting RF communication signals within a printed circuit board of the wireless communication device such as from a transceiver to the I/O port, the printed circuit board must be properly designed to minimize signal loss and interference from other signals and provide the proper impedance matching. That is, the location of the transmission lines within in the layers of the printed circuit board should be chosen depending upon, among other factors, the number of layers of the printed circuit board, the location of ground planes and components, the selection of dielectric materials or housings. Although there are numerous arrangements, one common arrangement for the transmission of communication signals includes a stripline construction wherein the transmission line is covered on either side by a ground plane. Another common arrangement for transmitting RF communication signals within the printed circuit board is a microstrip transmission line having a transmission line on the surface of a dielectric layer whose bottom surface is covered by a ground plane. Although the microstrip has fewer layers and is therefore thinner, this construction generally provides less isolation. In either case, the transmission line is designed to create a 50 ohm impedance to provide the proper matching to transfer signals between the wireless communication device and an external device by way of the I/O port.

In coupling RF communication signals to an external device by way of the I/O port, the RF communication signals must be transmitted from the transmission line with minimal loss of signal. Prior art devices have used conventional coaxial connectors exposed in the I/O port of the telephone adapted to mate with a corresponding exposed coaxial connector in the connector portion of an external device such as a charging cradle or a cable adapted to be coupled to an external device. Coaxial cables have previously been required to reduce RF interference at the receiver of the wireless communication device. However, such coaxial cables at the I/O port often require additional space than a conventional connector not having a coaxial cable. That is, the mating portion of the connector in the I/O port or associated with the external device is generally thicker. Also, such connectors can be generally more costly and more susceptible to damage over time.

Accordingly, there is a need for a method and apparatus having a reduced size for coupling radio frequency signals from a wireless communication device to an external port. There is also a need for durable, low cost apparatus for coupling radio frequency signals from a wireless communication device to an external port.

DESCRIPTION OF THE PREFERRED EMBODIMENTS

The present invention provides a novel method and apparatus for coupling radio frequency signals from a wireless communication device to an external device by way of an I/O port. While prior art devices have used conventional coaxial connectors exposed in the I/O port of the telephone and in the connector portion of an external device, such coaxial cables at the I/O port often require additional space and are generally more costly and more susceptible to damage over time than a conventional connector not having a coaxial cable. Coaxial connectors integral to a mating portion of a connector have previously been required to reduce RF interference at the receiver of the wireless communication device. However, the method and apparatus of the present invention provides a reduced size, less expensive and more reliable device for coupling RF signals between a wireless communication device and an external device. In particular, a first coaxial connector is removed from the wireless communication device and a second coaxial connector is selectively moved to a position inside the mating connector of an external device. Components of the connectors are selectively grounded to eliminate RF interference picked up by any transmission lines created when eliminating the first coaxial connector in the wireless communication device and moving the second coaxial connector into the mating connector of the external device.

Figure 1:
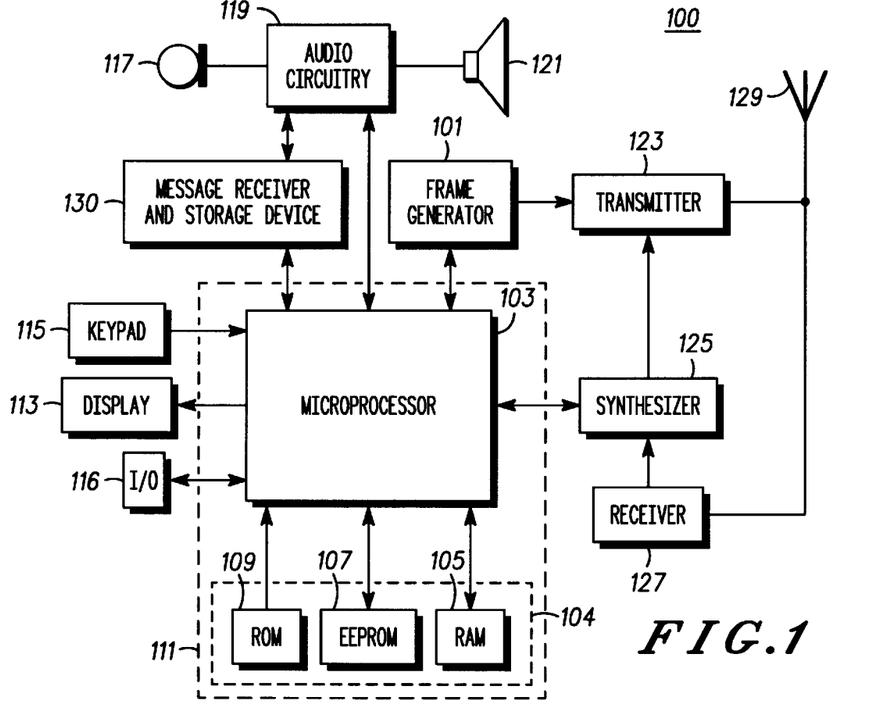
FIG. 1 is a block diagram of circuitry for a wireless communication device incorporating the present invention.

Turning now to FIG. 1, a block diagram of a wireless communication device such as a cellular radiotelephone incorporating the present invention is shown. In the preferred embodiment, a frame generator ASIC 101, such as a CMOS ASIC available from Motorola, Inc. and a microprocessor 103, such as a 68HC11 microprocessor also available from Motorola, Inc., combine to generate the necessary communication protocol for operating in a cellular system. Microprocessor 103 uses memory 104 comprising RAM 105, EEPROM 107, and ROM 109, preferably consolidated in one package 111, to execute the steps necessary to generate the protocol and to perform other functions for the wireless communication device, such as writing to a display 113, accepting information from a keypad 115, accepting input/output information by way of a connector 116 according to the present invention, controlling a frequency synthesizer 125, or performing steps necessary to amplify a signal according to the method of the present invention. ASIC 101 processes audio transformed by audio circuitry 119 from a microphone 117 and to a speaker 121.

A transceiver processes the radio frequency signals. In particular, a transmitter 123 transmits through an antenna 129 using carrier frequencies produced by a frequency synthesizer 125. Information received by the communication device's antenna 129 enters receiver 127 which demodulates the symbols using the carrier frequencies from frequency synthesizer 125. The communication device may optionally include a message receiver and storage device 130 including digital signal processing means. The message receiver and storage device could be, for example, a digital answering machine or a paging receiver.

Figure 2:
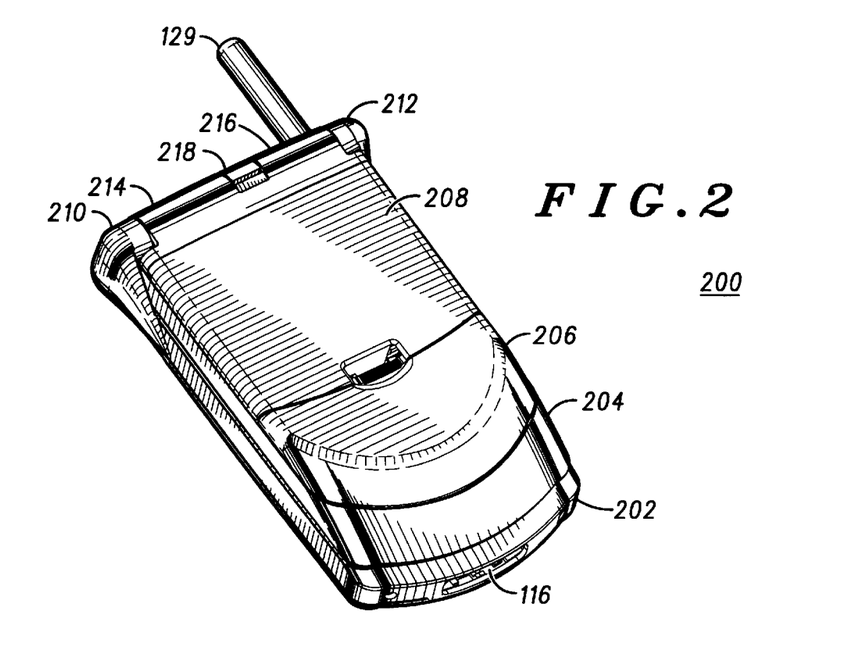
FIG. 2 is a wireless communication device incorporating the circuitry of FIG. 1.

Turning now to FIG. 2, a perspective view shows a foldable electronic device 200 such as a portable cellular radiotelephone having two hinged portions in the closed position. In particular, a lower housing 202 is coupled to an upper housing 204 having an outer housing cover 206 and a detachable battery 208. Lower housing 202 includes hinge elements 210 and 212 which intercouple with hinge elements 214 and 216 of upper housing 204. A cylinder 218 for routing conductors between lower housing 202 and upper housing 204 is positioned within upper housing 204 between hinge elements 214 and 216. Lower housing 202 preferably includes a first connector 116 for transmitting or receiving signals from an external device and antenna 129 for transmitting or receiving radio frequency (RF) signals. An example of a connector which could be employed according to the present invention includes the Model 3260-15S-3 connector available from Hirose USA, Ltd. having offices at 2688 Westhills Ct., Simi Valley, Calif. 93065.

Figure 3:
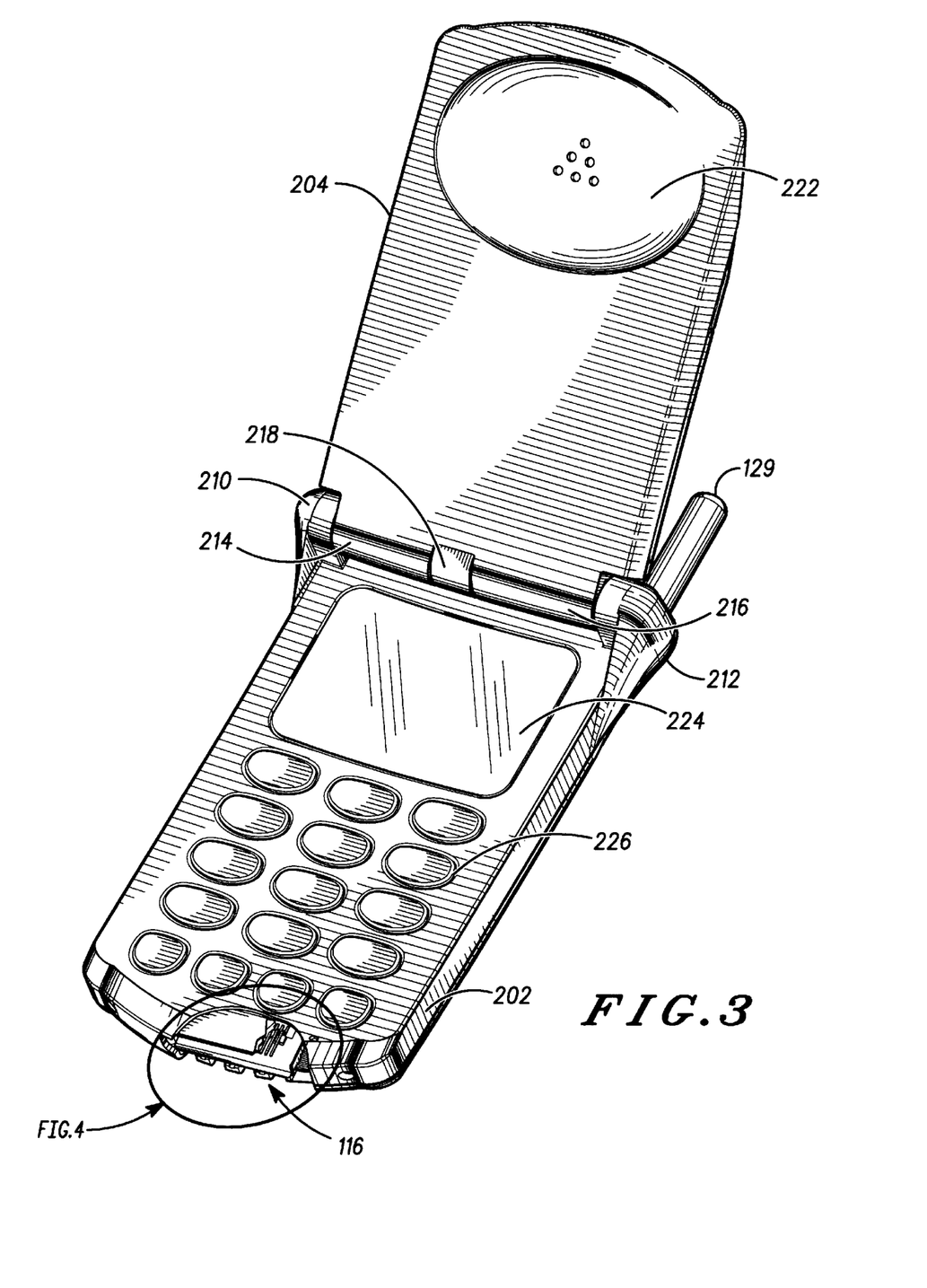
FIG. 3 is the wireless communication device of FIG. 2 in the open position, showing a partial cross-sectional view of a portion of a coupling apparatus associated with a wireless communication device according to the present invention.
Figure 4:
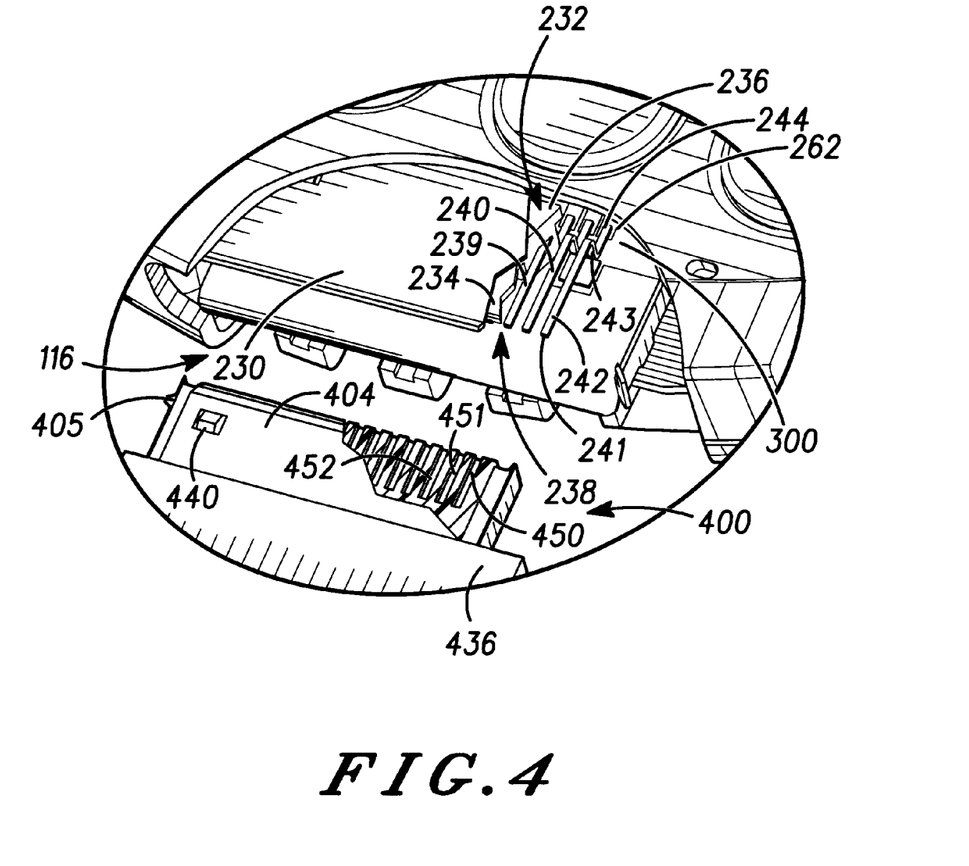
FIG. 4 is an exploded view of the portion of the coupling apparatus shown in partial cross-sectional view in FIG. 3.

Turning now to FIG. 3, the wireless communication device of FIG. 2 in the open position shows a cross-sectional view of a portion of the coupling apparatus according to the present invention. When in the open position, a speaker 222, a display 224, and a keypad 226 are exposed. As shown in the exploded partial cross-sectional view of FIG. 4, first connector 116 comprises an outer shroud 230 which covers a contact housing 232 having a guide support 234 and base portion 236. Because no coaxial connector is used within connector 116 and three conventional contact pins are used to transmit radio frequency signals, the conventional contact pins must be properly shielded. Accordingly, outer shroud 230 is composed of a material to shield radio frequency signals and other electromagnetic signals. Contact elements 238 including a ground contact 239, an RF contact 240 and a ground contact 241, are supported by contact housing 232. In particular, distal end portion 242 of contact element 238 extends along guide support 234 into base portion 236. An elbow portion 243 extends downward to a foot 244. As will be shown in more detail in reference to FIG. 6, the foot portions of the contacts are coupled to a printed circuit board 300.

Figure 5:
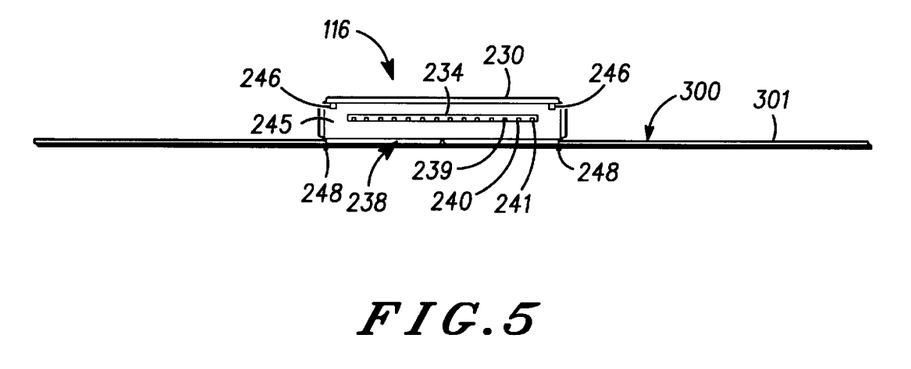
FIG. 5. is a elevational view of the portion of the coupling apparatus associated with the wireless communication device coupled to a printed circuit board.

Turning now to FIG. 5, an elevational view of first connector 116 coupled to a printed circuit board 300 is shown. As can be seen in the elevational view, outer shroud 230 encompasses contact elements 238 including ground contacts 239 and 241 positioned on either side of RF contact 240. Guide support 234 and contact elements 238 extend outward from a base portion 236 within gap 245 formed by outer shroud 230. The exposed contact elements 238 form a male portion which is adapted to mate with an associated female connector. First connector 116 further includes guide elements 246 to help guide a second connector shown in more detail in FIG. 12 which is adapted to mate with first connector 116, and attachment members 248 for soldering and grounding outer shroud 230.

Figure 6:
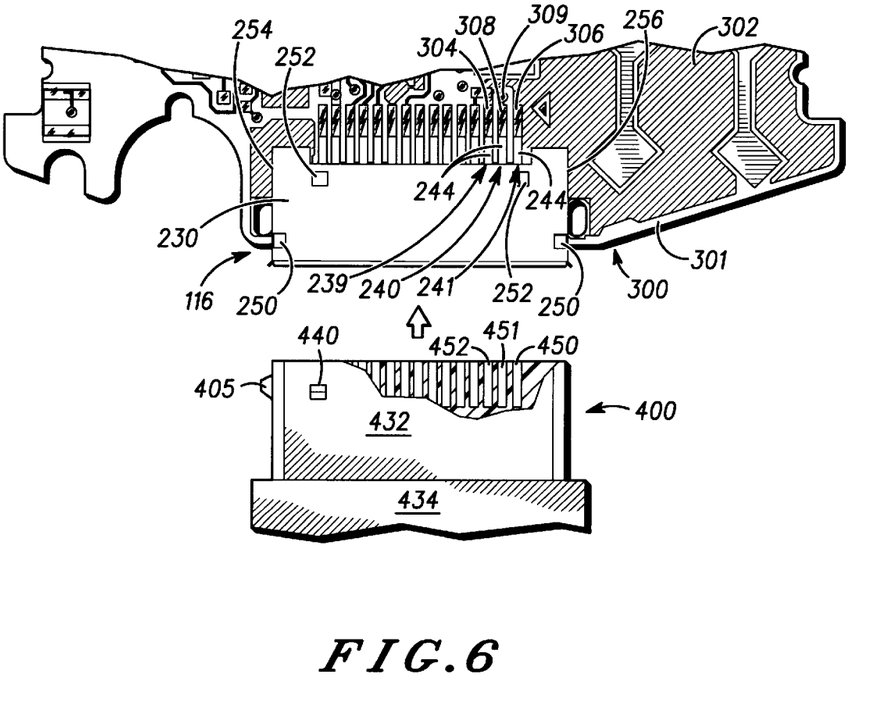
FIG. 6 is a plan view of the portion of the coupling apparatus associated with the wireless communication device and printed circuit board of FIG. 5.

Turning now to FIG. 6, a top plan view of first connector 116 and printed circuit board 300 is shown. An upper planar surface or first layer 301 includes a ground plane 302 and a plurality of contact pads. Feet 244 of ground contacts 239 and 241 are coupled to contact pads 304 and 306, which in turn are coupled to ground plane 302. Foot 244 of RF contact 240 is coupled to a contact pad 308 which couples a signal to another layer of the printed circuit board by way of a via or through hole 309. Outer shroud 230 further includes apertures 250 adapted to receive coupling members to attach a second connector to first connector 116 for latching the coupled connectors. Finally, the sides 254 of outer shroud 230 can be soldered to ground plane 302 to provide an adequate ground for the outer shroud. The remaining contact pads are coupled to various leads or traces on one or more layers of the printed circuit board to implement functions of the wireless communication device. The preferred functions of the remaining contact pads will be described in more detail in FIG. 7.

Figure 7:
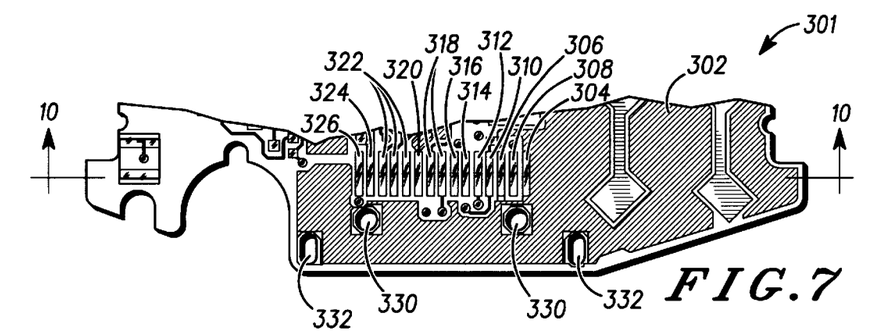
FIG. 7 is a plan view of a first layer of the printed circuit board of FIG. 5.

Turning now to FIG. 7, a top plan view shows first layer 301 of printed circuit board 300 without first connector 116. The additional contacts pads shown preferably include battery test contact 310, self test contact 312, unconnected contacts 314 and 316, audio input and output contacts 318, battery ground contact 320, digital data contacts 322, external battery power contact 324, and analog ground contact 326. The contact pads are preferably arranged to minimize interference between the digital data lines and the RF lines. In particular, the digital data lines and the RF transmission lines are separated to avoid energy from the transmission of RF communication signals corrupting data on the data lines or digital harmonics of the data lines being received by the receiver through a transmission line coupled to contact pad 308. The data communication by way of digital data contacts 322 can be accomplished as disclosed in U.S. Pat. No. 4,369,516 to John P. Byrns entitled Self-Clocking Data Transmission System.

Figure 8:
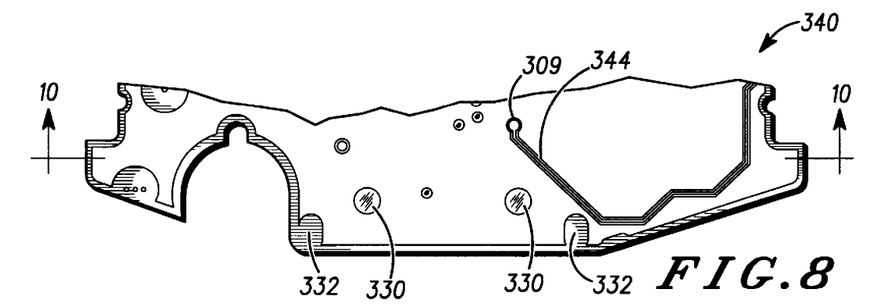
FIG. 8 is a plan view of a second layer of the printed circuit board of FIG. 5.
Figure 9:
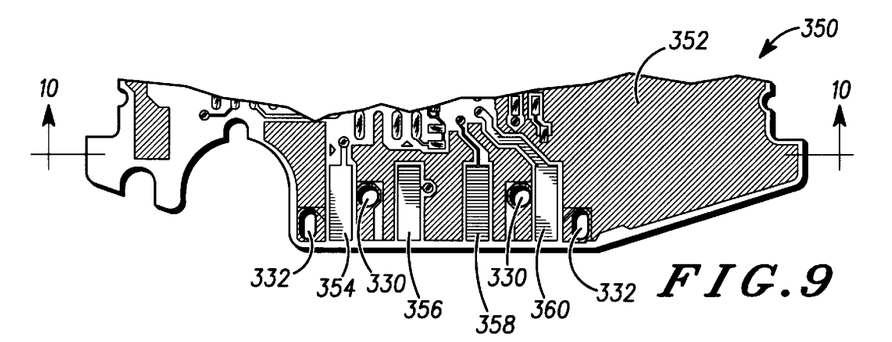
FIG. 9 is a plan view of a third layer of the printed circuit board of FIG. 5.

Also shown are guides 330 for receiving and aligning first connector 116 and through holes 332 for receiving attachment members 248 of outer shroud 230. The through holes and attachment members enable adequate coupling and grounding of the outer shroud to ground plane 302. As shown in FIG. 8, a second layer 340 of printed circuit board 300 is shown. An RF transmission line 344 provides a conductive path and is coupled to a portion 346 of through hole 309 which transmits RF communication signals to and receives RF communication signals from contact pad 308. Finally, a third layer 350 as shown in FIG. 9 provides a ground plane. In particular, a ground plane 352 provides the lower ground for the strip line construction of the transmission line which will be described in more detail in FIG. 10. In addition, contacts 354, 356, 358, and 360 are shown. These contacts could be used, for example, as battery contacts.

Figure 10:
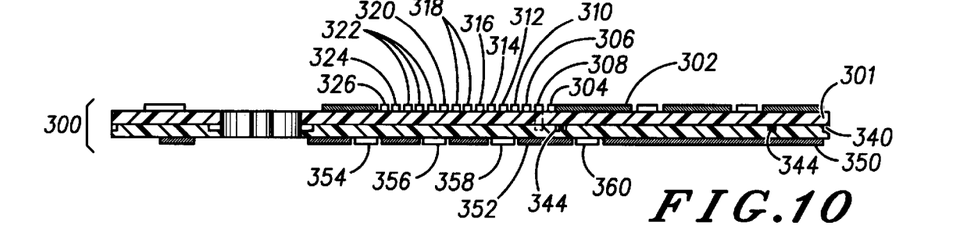
FIG. 10 is a composite cross-sectional view of the three layers of the printed circuit board shown in FIGS. 7, 8, and 9 taken at lines 10—10.

Turning now to FIG. 10, a composite cross-sectional view of the three layers of the printed circuit board shown in FIGS. 7, 8, and 9 taken at lines 10—10 show a strip line construction for the transmission line. In particular, ground plane 302 of first layer 301 and ground plane 352 of third layer 350 surrounding transmission line 334 to form a strip line. The materials and dimensions of the conductors, dielectrics and other materials are selected to create a 50 Ohm impedance to provide the proper impedance matching at connector 116 as is well known in the art. Although a strip line construction is shown, a microstrip construction could also be employed according to the present invention. Also, contact pads positioned on first layer 301 could be coupled to other layers of the board than those shown. Although only three layers are shown, additional layers could be employed as necessary to implement the functions of the wireless communication device. Also, contact elements of the first connector could be directly coupled to one or more other layers of the board other than the first layer within the scope of the present invention.

Figure 11:
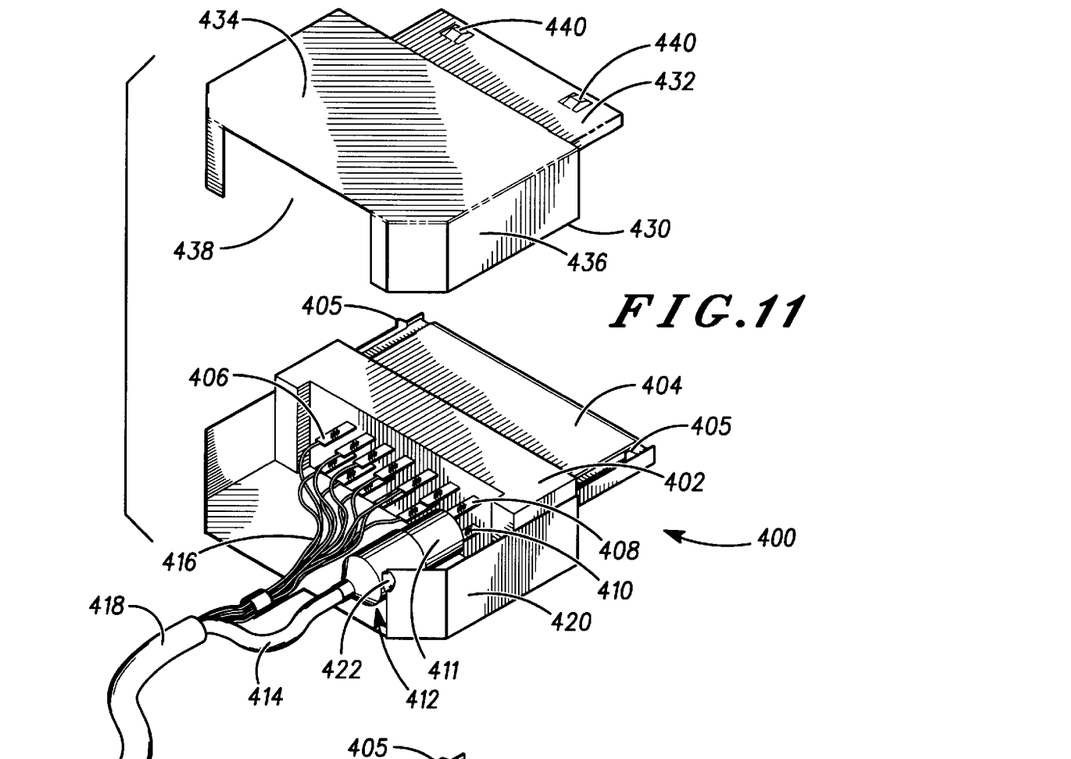
FIG. 11 is an exploded view of a second portion of the coupling apparatus associated with an external device according to the present invention.
Figure 13:
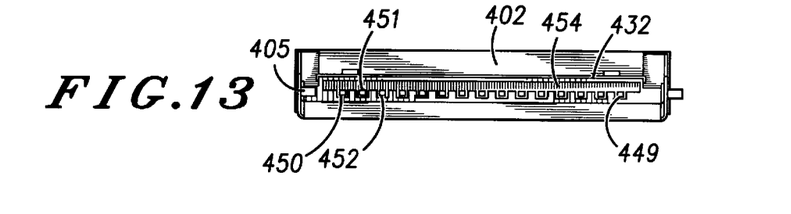
FIG. 13 is an elevational view of the mating portion of the second connector of FIG. 12.

Turning now to FIG. 11, an exploded view of a second connector 400 adapted to mate with first connector 116 is shown. In particular, second connector 400 comprises a main body portion 402 and a contact portion 404. Coupling members 405 positioned along the outer edges of contact portion 404 are adapted to engage apertures 250 of first connector 116 as shown in FIG. 6 for latching the coupled connectors. Contact elements 406 including first ground contact (not visible) and second ground contact 410 provide electrical signals or a ground path through contact portion 404 to distal end portions 449 as shown in FIG. 13. Ground contact 410 and a second ground contact (not visible) corresponding to ground contacts 239 and 241 of first connector 116 are coupled to the outer conductor 411 of a coaxial connector 412. RF contact 408 corresponding to the RF line is coupled to the center conductor of the coaxial connector. A coaxial cable 414 and wires 416 are routed from second connector 400 by way of a cable 418 enclosing coaxial cable 414 and wires 416.

Main body portion 402 and contact portion 404 is surrounded by a shield 420 to minimize RF interference received from other devices or leakage of RF signals from the connector. Outer conductor 411 of the coaxial connector is coupled to shield 420 by solder contact 422. By positioning the coaxial connector within connector 400, RF contact element 408 is exposed and may transmit RF interference signals to the receiver of the wireless communication device. Accordingly, connector 400 also must be properly shielded from RF interference. As shown in FIG. 11, a shield cover 430 is adapted to fit over main body portion 402 and contact portion 404 to provide a shielding of the connector in conduction with shield 420. In particular, contact shield portion 432 and main shield portion 434 of shield cover 430 substantially cover the upper surface of second connector 400. Side portions 436 overlap with shield 420 to substantially enclose second connector 400. Grounding tabs 440 make a positive connection to outer shroud 230 of connector 116 when connector 116 and connector 400 are mated.

Figure 12:
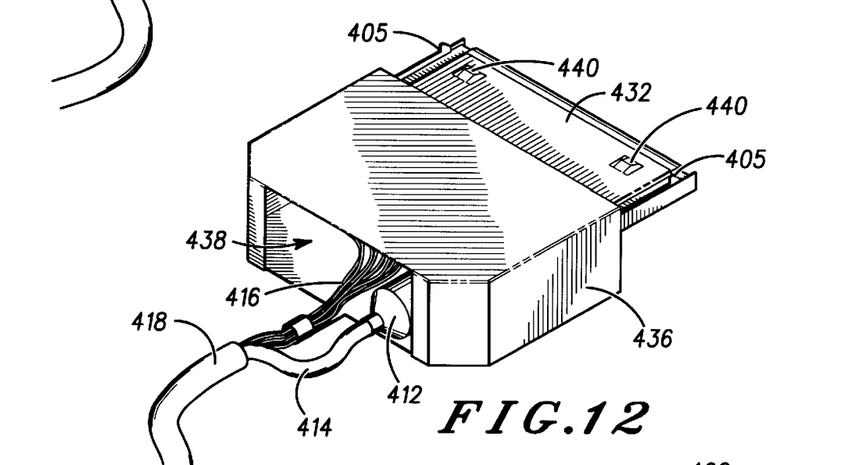
FIG. 12 is a perspective view of the second connector of the coupling apparatus of FIG. 11 as assembled.

As shown in FIG. 12, the fully assembled connector includes an aperture 438 to allow coaxial cable 414 and wires 416 to extend from the end of the connector. Outer shroud 430 is electrically coupled to shield 420 to completely shield the connector. This coupling creates a common ground between ground plane 302 and connector 116 of the wireless communication device and connector 400 including coaxial connector 412 and the ground contacts of connector 400 which are connected to the outer shield of coaxial connector 412. A separate, non-conductive cover (not shown) can be inserted over the main body portion of the connector and the rear opening to fully enclose coaxial cable 414 and wires 416.

Turning now to FIG. 13, a front elevational view of connector 400 of FIG. 12 shows distal end portions 449 of contact elements 406. In particular, a ground contact 450, an RF contact 451 and a second ground contact 452 are shown, RF contact 451 coupling to RF contact 408 (FIG. 11) and ground contacts 450 and 452 coupling to ground contacts 410 (FIG. 11) and one other (not shown in FIG. 11), respectively. Distal end portions 449 of contact elements 406 are adapted to mate with distal end portions 242 of contact elements 238 of first connector 116. In particular, guide support 234 and distal ends of contact elements 238 of first connector 116 are adapted to be inserted into an aperture 454, allowing distal end portions of contacts 450, 451, and 452 to be operatively coupled to 241, 240, and 239 respectively.

In summary, the present invention provides a novel method and apparatus for coupling radio frequency signals from a wireless communication device to an external device by way of an I/O port. Coaxial connectors integral to a mating portion of a connector have previously been required to reduce RF interference at the receiver of the wireless communication device. While prior art devices have used conventional coaxial connectors exposed in the I/O port of the telephone and in the connector portion of an external device, such coaxial cables at the I/O port often require additional space and are generally more costly and more susceptible to damage over time than a conventional connector not having a coaxial cable. The method and apparatus of the present invention provides a reduced size, less expensive and more reliable device for coupling RF signals between a wireless communication device and an external device by eliminating the need for a coaxial connector exposed in a connecting device. In particular, a first coaxial connector is eliminated from the wireless communication device and a second coaxial connector of an external device is selectively moved to a position inside the external connectors. Components of the mating connectors are selectively grounded to eliminate RF interference picked up by any transmission lines created when eliminating or moving the coaxial connectors.

Although the invention has been described and illustrated in the above description and drawings, it is understood that this description is by way of example only and that numerous changes and modifications can be made by those skilled in the art without departing from the true spirit and scope of the invention. For example, any existing connector could be modified according to the present invention to incorporate the method and apparatus as disclosed and claimed. Although the present invention finds particular application in portable cellular radiotelephones, the invention could be applied to any wireless communication device, including pagers, electronic organizers, or computers. Our invention should be limited only by the following claims.

We claim:

1. An apparatus for coupling radio frequency signals from a wireless communication device to an external device, wherein said wireless communication device includes a circuit board, a first connector and a first shield, said circuit board having a plurality of layers comprising at least:

a first layer having a ground plane and a plurality of contact pads comprising three adjacent contact pads wherein said first and third contact pads of said three adjacent contact pads are electrically coupled to said ground plane of said first layer; and a second layer having a conductive path wherein said second contact pad of said three adjacent contact pads is electrically coupled to said conductive path, and wherein said first connector is coupled to said circuit board for coupling said radio frequency signals to said external device, said first connector having a first plurality of conductive elements comprising three adjacent conductive elements which are electrically coupled to said three adjacent contact pads of said plurality of contact pads of said first layer, and wherein said first shield is adapted to substantially cover said first plurality of conductive elements of said first connector, said first shield being coupled to said ground plane of said first layer, said apparatus comprising:

a second connector for operatively coupling to said first connector, said second connector comprising a second plurality of adjacent conductive elements adapted to mate with said first plurality of conductive elements, said second plurality of adjacent conductive elements comprising a first element, a second element and a third element for operatively coupling with each of said three adjacent conductive elements, respectively; and a second shield substantially covering said second plurality of conductive elements wherein said second shield electrically couples to said first shield when said second conductor operatively couples to said first connector, and wherein said first element and said third element of said second plurality of conductive elements are electrically coupled to an outer conductor of a coaxial connector which is electrically connected to said second shield.

2. The apparatus for coupling radio frequency signals of claim 1 wherein said second element of said second plurality of conductive elements is coupled to an inner conductor of said coaxial connector.

3. An apparatus for coupling radio frequency signals from a wireless communication device to an external device comprising:

a first connector comprising a plurality of adjacent conductive elements including first, second and third ones of said plurality of adjacent conductive elements and other ones of said plurality of adjacent conductive elements, wherein said plurality of adjacent conductive elements are adapted to make a connection to a second connector of said wireless communication device, and wherein said first and third ones of said plurality of adjacent conductive elements separate said second one of said plurality of adjacent conductive elements from said other ones of said plurality of adjacent conductive elements;

a shield substantially covering said plurality of adjacent conductive elements wherein said first and third ones of said plurality of adjacent conductive elements are electrically coupled to said shield; and a coaxial connector coupled to said first connector and including an outer conductor and an inner conductor, wherein said first and third ones of said plurality of adjacent conductive elements are electrically coupled to said outer conductor of said coaxial connector, and wherein said outer conductor is electrically connected to said shield.

4. The apparatus for coupling radio frequency signals of claim 1 wherein said second one of said plurality of adjacent conductive elements is coupled to said inner conductor of said coaxial connector and is adapted to make connection to a corresponding conductive element of said second connector for receiving said radio frequency signals therefrom.

5. An apparatus for coupling radio frequency signals from a wireless communication device to an external device comprising:

a first connector comprising a plurality of exposed conductive elements for coupling to a similar plurality of conductive elements of a second connector, said wireless communication device including said second connector;

a coaxial connector positioned within said first connector wherein first and third conductive elements of said plurality of exposed conductive elements are coupled to an outer conductor of said coaxial connector and wherein a second conductive element of said plurality of exposed conductive elements is coupled to an inner conductor of said coaxial connector and is adapted to connect to a corresponding one of said similar plurality of conductive elements of said second connector for receiving said radio frequency signals therefrom; and a shield substantially covering said plurality of exposed conductive elements, said shield electrically coupled to said outer conductor of the coaxial connector.

* * * * *